Dec. 24, 1940. C. H. KESTENMAN 2,225,746

LINKAGE

Filed May 24, 1940

Inventor:
Charles H. Kestenman
By Shuningham and White
Attorneys.

Patented Dec. 24, 1940

2,225,746

UNITED STATES PATENT OFFICE 2,225,746

LINKAGE

Charles H. Kestenman, Providence, R. I., assignor to Kestenman Bros. Mfg. Co., Providence, R. I., a corporation of Rhode Island Application May 24, 1940, Serial No. 337,015

7 Claims. (Cl. 59—79)

This invention relates to improvements in the manufacture of expansible or extendible linkages for use in articles of jewelry such as bracelets, bands, belts and the like.

One object of the invention is to provide an improved method and means for articulating or pivotally connecting the elements of a linkage or bracelet.

Another object of the invention is to provide an improved pivotal connection between the parts of the linkage which eliminates riveting or similar mechanical operations for connecting the parts.

Another object of the invention is to provide improved pivot-means for connecting the links whereby they may be assembled more conveniently and expeditiously without mechanical operations.

Another object of the invention is to provide a novel form of pivotal joint for the parts of a linkage by means of which the links may be connected without mechanical operations and when so connected are locked securely against disconnection in use.

Further objects of the invention are set forth in the following specification which describes a preferred form of construction of an extensible linkage for bracelets and the like as illustrated by the accompanying drawing. In the drawing.

Figure 1:
Fig. 1 is a plan view of a watch-bracelet embodying the present invention.
Figure 2:
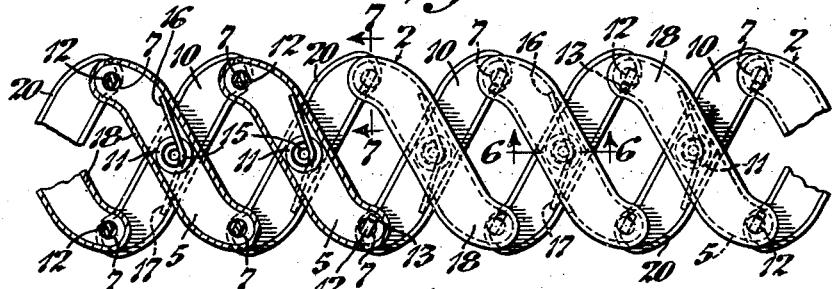
Fig. 2 is a greatly enlarged plan view of a section of the present improved expansible linkage showing it extended and illustrating certain of the pivot joints and other mechanical features thereof.

The present invention is adapted particularly for use in the manufacture of flexible bracelets, bands and other extendible linkages of a type now popular in watch-bracelets. This type of linkage comprises a plurality of articulated members pivotally connected at their centers and also pivotally joined at their extremities in X-relationship similar to the construction of the familiar lazy-tongs. The present improved linkage may consist of a plurality of elongate members 2 of generally S-shape pivotally connected at their centers in superimposed relationship and with their opposite ends also pivotally joined so that they may be contracted into close association as shown in Fig. 1, or extended as indicated in Fig. 2, by rocking them on their central pivots. When embodied in articles of jewelry, the linkage is preferably constructed with the pivotally-connected link-elements enclosed in similarly-shaped shells which may be of precious metal or plated therewith to embellish the complete article and conceal its mechanical construction.

Figure 8:
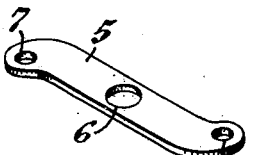
Fig. 8 is a perspective view of one of the links.
Figure 9:
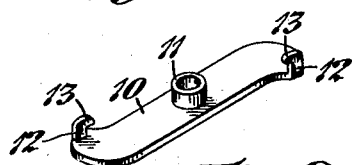
Fig. 9 is a similar view of a complementary link for connection with the link illustrated in Fig. 8.

The mechanical pivotal elements are constructed in complementary pairs in the form shown in Figs. 8 and 9, being preferably stamped out from sheet-metal. Each link-element 5 consists preferably of a flat substantially S-shaped stamping having an elongate main portion with relatively straight sides and oppositely-curved ends. The element 5 is punched or perforated at the center to provide a relatively large circular opening 6, while at its ends are smaller circular openings 7.

Figure 6:
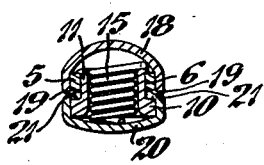
Fig. 6 is a further enlarged sectional view on line 6—6 of Fig. 2 showing the central pivotal joint between the links and the spring means for maintaining the linkage contracted.

The complementary link 10 which is pivoted centrally to the link 5 crosswise thereof is of the same general shape as the latter, but adapted to be connected thereto in reverse underlying relationship. For this purpose the link 10 is provided at its center with an upstanding cylindrical flange forming a hollow rivet 11 adapted for insertion through the central opening 6 in the top link 5 with its end riveted or swaged over the edge thereof, as shown in Fig. 6, to pivotally connect the two link-elements. Each pair of link-elements 5 and 10 are assembled and pivotally connected in this manner and their ends pivotally joined to adjacent pairs of link-elements of the same form and construction. In this manner a whole series of links are assembled in crossed and superimposed relationship with their ends pivotally joined to provide for extension of the linkage as a whole.

Figure 3:
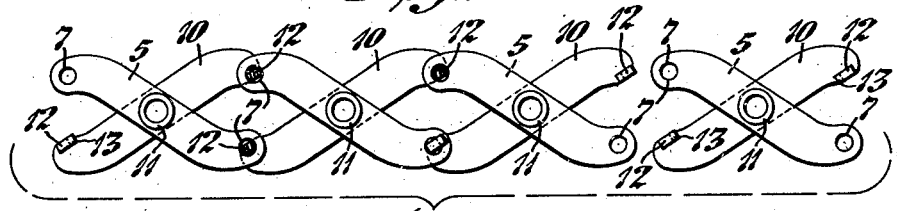
Fig. 3 is a composite detailed view showing a plurality of the links connected by the present improved pivot joints and also illustrating a pair of links disconnected therefrom.
Figures 4, 5:
Fig. 4 is a detailed view showing a pair of cooperating links to be connected tilted in angular relationship to adapt the lug on one link to be hooked through an opening in the other link.
Fig. 5 is a view similar to Fig. 4 showing the cooperating links rocked back to normal position to pivotally connect them to each other.

The present improvement relates particularly to the means for pivotally connecting the outer ends of the link-elements 5 and 10 and for this purpose the link 10 is formed at its ends with upwardly-projecting prongs or lugs 12 having lateral projections or hooks 13 at their upper ends. Preferably, the prongs or lugs 12 are constructed integrally of the links in the stamping operation, but they may be made separate therefrom and suitably attached thereto. The link-members 5 and 10 are assembled in pairs by placing the member 5 in overlying relationship with the member 10 and inserting the cylindrical flange 11 on the member 10 through the opening 6 in the upper member as shown in Fig. 3. The end of the flange 11 is then swaged or headed over as shown in Fig. 6 to retain the parts in pivotal connection. Each pair of link-elements 5 and 10 thus assembled are joined at their ends to other pairs of links of similar construction and arrangement by first arranging the two pairs of connected elements 5 and 10 in substantial alinement and then tilting one of the pairs of connected elements with respect to the other pair as illustrated in Fig. 4 until the end of the projection or hook 13 and circular opening 7 of one pair are alined with the circular opening and projection or hook of the other pair, respectively. By simultaneously rocking the pairs of elements into a common plane and relatively rotating or twisting them about an axis extending through their pivotal centers the projections or hooks 13 pass through the openings 7 in the opposite elements. The lugs 12 are then positioned in the openings 7 to pivotally connect the ends of the links and the projections 13 at the ends of the lugs overlie the sides of the opposite links adjacent the openings. In other words, the projections 13 on the lugs 12 act as heads or abutments to hold the parts connected. A whole series of pairs of links are joined together in this manner to provide a linkage of any desired length.

To cause the linkage to be maintained normally in contracted relationship as shown in Fig. 1, a plurality of helical springs 15 are enclosed within the cylindrical flanges or hollow rivets 11 on the elements 10 with their opposite ends extending outwardly and bearing against the sides of the shells 18 and 20 which enclose the top and bottom of the joined link-elements 5 and 10.

The upper shell 18 is preferably formed of concavo-convex shape with a highly crowned top and vertical sides conforming to the sides of the upper link-element 5 to fit in closely abutting relation thereagainst; the lower edges 19 of the sides being swaged or formed in under the edges of the link to attach the shell thereto, as clearly illustrated in Fig. 6. The bottom shell 20 is of similar form and construction except that it has a less crown or convexity and the upper edges 21 of its sides are swaged around the upper edges of the link-element 10. The upper end of each spring 15 extends outwardly in a straight arm 16 with its end bearing against the side of the upper shell 18, while the lower arm 17 of the spring is similarly directed against the side of the bottom shell 20; the springs being thus maintained under tension with their ends exerting a force against each upper and lower link-element and tending to swing them o ntheir central pivots to bring them into substantial alinement.

Figure 7:
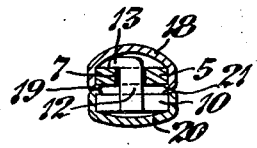
Fig. 7 is an enlarged sectional view taken on line 7—7 of Fig. 2 and illustrating the present improved pivotal joint for connecting the outer ends of the links.

As illustrated in Figs. 6 and 7 the lower swaged edge or flange 19 of the upper shell 18 and the upper swaged edge 21 of the bottom shell 20 extend between the link-elements 5 and 10 to hold the ends of the link-elements 5 against the projections 13 on the link-element 10 whereby to prevent sufficient relative rocking or twisting movement of the link-elements to disconnect them from each other. Consequently, the last operation of assembling the shells 18 and 20 on the pairs of link-elements 5 and 10 provides means for limiting the rocking or twisting of the linkage and thereby prevents the disconnection of the elements at their ends. It will thus be seen that after the parts of the linkage are once assembled the pivoted joints at the ends of the links cannot be released.

From the foregoing specification it will be apparent that the present invention provides a particularly simple yet ingenious method of pivotally connecting the parts of a linkage without requiring riveting or other like mechanical operations. The present form of linkage is adapted for use as an expansible or extendible bracelet, band or the like either as a whole, or as a section thereof. The improved linkage is not only of highly ornamental appearance but has great utility in providing for expansion of the bracelet to allow it to slip over the hand in applying it to the wrist and then conforming to the shape of the wrist to provide a comfortable fit.

While the device is herein shown as embodied in a preferred form of construction, it is to be understood that various modifications may be made in the structure and arrangement of its parts without departing from the spirit or scope of the invention. Therefore, without limiting myself in this respect, I claim:

1. In a linkage for articles of jewelry such as bracelets, bands, belts and the like, the combination of a plurality of link-elements, and means for pivotally connecting said link-elements comprising openings at the ends of certain of said elements and hooked prongs on cooperating link-elements, the hooked prongs on certain of the elements engaging through the openings in the other link-elements with the hooks adapted to overlie the sides of said openings to prevent disconnection of the link-elements.

2. In a linkage for articles of jewelry such as bracelets, bands, belts and the like, the combination of a plurality of link-elements, means for pivotally connecting said link-elements comprising openings at the ends of certain of said elements and hooked prongs on cooperating link-elements, the hooked prongs on certain of the elements engaging through the openings in the cooperating link-elements with the hooks adapted to overlie the sides of said openings, and means for holding the cooperating link-elements against movement tending to unhook them one from the other.

3. In a linkage for articles of jewelry such as bracelets, bands, belts and the like, the combination of a plurality of link-elements, means for pivotally connecting said link-elements comprising openings at the ends of certain of said elements and hooked prongs on cooperating link-elements, the hooked prongs on certain of the link-elements engaging through the openings in the cooperating link-elements with the hooks adapted to overlie the sides of said openings, and means for holding the hooked portion of the prongs on certain of the elements against the side of the cooperating link-elements to prevent rocking movement tending to disconnect one element from the other.

4. In a linkage for articles of jewelry such as bracelets, bands, belts and the like, the combination of a plurality of link-elements, means for pivotally connecting said link-elements comprising openings at the ends of certain of said elements and hooked prongs on cooperating link-elements, the elements having the prongs being adapted to be rocked with respect to the elements having the openings to hook the prongs into the openings, and means between the connected link-elements to hold the hooked prongs against the sides of the element having openings whereby to prevent rocking movement of the link-elements tending to unhook them one from the other.

5. In a linkage for articles of jewelry such as bracelets, bands, belts and the like, the combination of a plurality of link-elements, means for pivotally connecting said link-elements comprising openings at the ends of certain of said link-elements and hooked prongs on cooperating link-elements, the elements having the prongs being adapted to be rocked with respect to the elements having the openings to hook the prongs into the openings, and shells embracing the link-elements and having inturned flanges at their edges extending between the link-elements for holding the latter against relative movement tending to disconnect the hooked prongs.

6. A linkage for articles of jewelry and the like comprising a series of link-elements having prongs at the ends of certain of said link-elements with hooks projecting laterally from said prongs, cooperating link-elements superimposed on the first-named link-elements and having openings at their ends for receiving the hooked prongs on the first-named elements, and shells embracing the link-elements and having inturned flanges at their edges extending between the link-elements for restraining the latter against relative movement tending to disconnect the prongs from the openings in which they are hooked.

7. A linkage for bracelets or like article comprising two sets of link-elements pivoted together at their centers in superimposed relationship, one set of link-elements having openings at their ends and the other set of link-elements having prongs extending through the openings of the other set with hooks at the ends of the prongs overlying the sides of the openings, resilient means for relatively swinging the elements to contract the linkage, and shells embracing the link-elements and having inturned flanges at their edges extending between the link-elements.

CHARLES H. KESTENMAN.